United States Patent
Kuhn et al.

[11] 3,786,630
[45] Jan. 22, 1974

[54] DEVICE FOR CONNECTING EXHAUST MANIFOLD SETS TO THE TURBO-BLOWERS OF A SUPERCHARGED INTERNAL-COMBUSTION ENGINE

[75] Inventors: Karl Walter Kuhn, Saint-Germain-en-Laye; Jacques Gallois, Paris, both of France

[73] Assignee: Societe D'Etudes de Machines Thermiques, St. Denis, France

[22] Filed: Nov. 23, 1971

[21] Appl. No.: 201,410

[30] Foreign Application Priority Data
Jan. 15, 1971  France ............................ 71.01345

[52] U.S. Cl. ............................ 60/13, 123/119 CB
[51] Int. Cl. ............................................ F02c 37/04
[58] Field of Search .............. 60/13; 123/119 CB

[56] References Cited
UNITED STATES PATENTS

| | | | |
|---|---|---|---|
| 3,469,393 | 9/1969 | Tryhorn | 60/13 |
| 2,522,118 | 9/1950 | Kadenacy | 60/13 |
| 3,077,071 | 2/1963 | Leichtfuss | 60/13 |
| 3,618,313 | 11/1971 | Zehnder | 60/13 |
| 3,064,417 | 11/1962 | Tryhorn et al. | 60/13 |
| 2,637,160 | 5/1953 | Thomas | 60/13 |

FOREIGN PATENTS OR APPLICATIONS
1,240,181  7/1960  France .................................. 60/13

OTHER PUBLICATIONS
The Application of Pulse Converters to 4 Stroke Diesel Engines, offprint of Brown Boveri Review 1968, No. 8 pgs. 1–11.

*Primary Examiner*—Carlton R. Croyle
*Assistant Examiner*—Warren Olsen
*Attorney, Agent, or Firm*—Kenyon & Kenyon Reilly Carr & Chapin

[57] ABSTRACT

In a supercharged internal combustion engine provided with two rows of V-shaped cylinders, each row being fed by a turbo-blower and having an associated cluster of exhaust manifolds, an arrangement for connecting said clusters of exhaust manifolds to said turbo-blowers, wherein each cluster of exhaust manifolds is connected by a convergent nozzle forming a pulse converter with its associated turbo-blower through a compact intermediate chamber common to both clusters, said chamber being mounted between the turbo-blowers and forming a mixing and attenuating casing.

4 Claims, 4 Drawing Figures

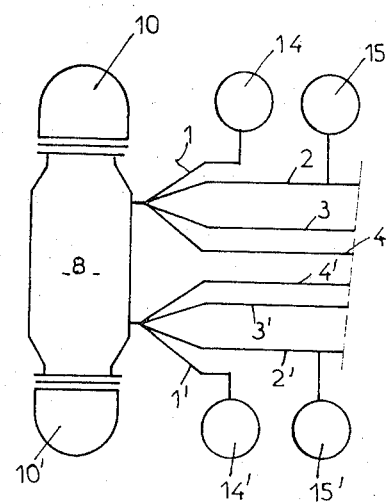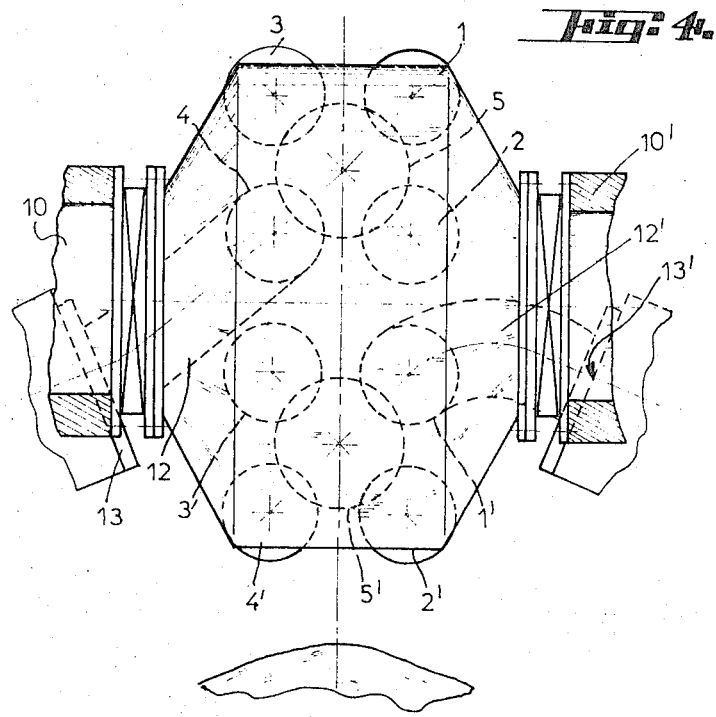

DEVICE FOR CONNECTING EXHAUST MANIFOLD SETS TO THE TURBO-BLOWERS OF A SUPERCHARGED INTERNAL-COMBUSTION ENGINE

The present invention relates to and has essentially for its object a device for connecting exhaust manifold sets to the turbo-blowers of a supercharged internal-combustion engine, more particularly of the Diesel type, provided with two rows of cylinders in V-arrangement, each fed by a turbo-blower. The invention applies more particularly to supercharged Diesel engines provided with a great number of cylinders, for instance more than 12 cylinders in two rows in V-arrangement, to each of which is associated a set of exhaust manifolds.

In engines of this type, each set of manifolds is usually connected with several separate inlets of one and the same turbo-blower. In such a design, multiple pipings for connection to the turbo-blower must be provided, thus leading to increased pressure losses of the exhaust gases and increased thermodynamic losses of the latter, the result being a reduction of the efficiency of the gases recovered, in particular for the driving of the intake-air compressors. Furthermore, the cyclic operation of the cylinders results in fluctuations in the pressure and flow of the exhaust gases supplied to the turbo-blowers.

The invention has for its purpose to remedy the drawbacks just mentioned, by providing an optimum grouping of the exhaust manifolds in a reduced space. To this end, the connecting device according to the invention is characterized in that each set of exhaust manifolds is connected through the medium of a pulsation-converter convergent nozzle with its associated turbo-blower through a compact intermediate chamber common to both manifold sets, mounted between the turbo-blowers and forming a mixer casing attenuating the gas-pulsation phenomena.

According to another feature of the invention, the said pulsation coverter is constituted by partitions or plates arranged according to a crossed, starred or juxtaposed configuration forming compartments within the convergent nozzle, the said compartments being respectively connected with the associated set of manifolds.

According to another feature of the invention, an expansion compensator is provided in the region of connection of the said mixer casing with the convergent nozzles and/or turbo-blowers.

The invention will be better understood and other purposes, features and advantages thereof will appear as the following description proceeds, with reference to the appended drawings given solely by way of example illustrating one form of embodiment of the invention and wherein.

Figure 1:
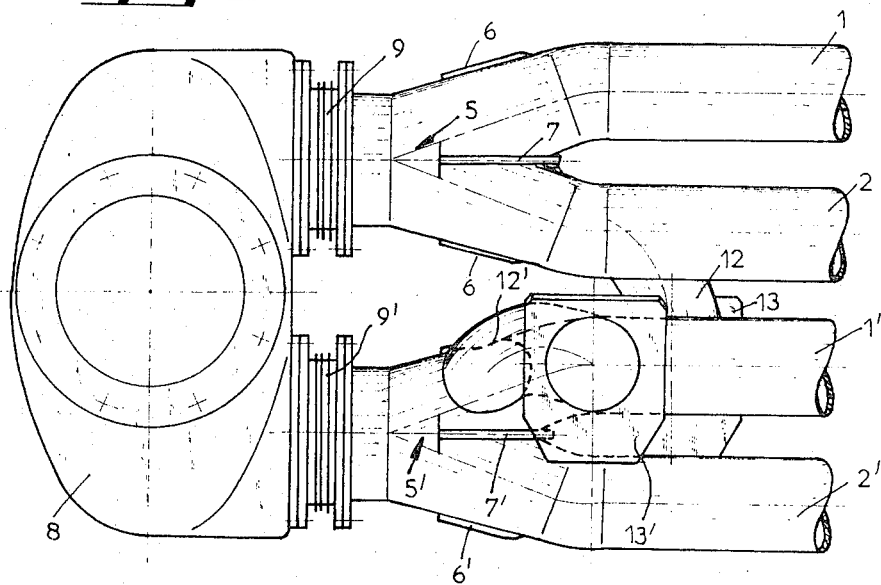
FIG. 1 is a front view of the connecting device according to the invention, used in connection with two sets of four manifolds.

FIG. 3 diagrammatically illustrates the principle of connection of the manifolds to the turbo-blowers by means of the device according to the invention; and FIG. 4 is a left-side view of the device shown in FIG. 1.

Figure 2:
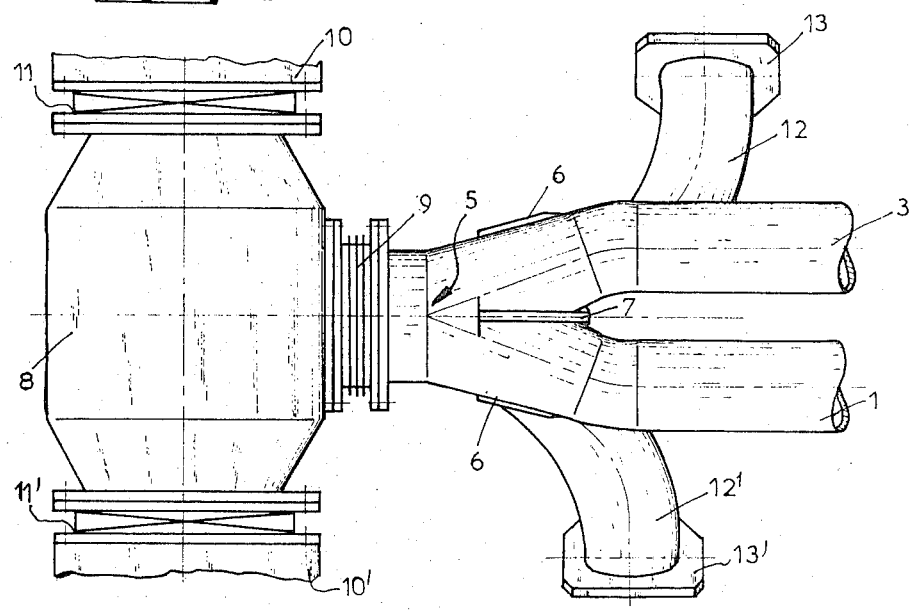
FIG. 2 is a top view of the device of FIG. 1.

The connecting device designed according to the present invention and illustrated in the appended drawings is used in connection with a supercharged Diesel engine provided with eight exhaust manifolds distributed in two sets of four manifolds 1,2,3,4 and 1',2',3',4'. The said manifold sets are located between the two rows of cylinders in V-arrangement (not shown). The two rows of cylinders are each fed by a turbo-blower 10 and 10' respectively. To each turbo-blower 10 and 10' is associated a set of exhaust manifolds 1,2,3,4 and 1',2',3',4' respectively. Referring to FIGS. 1 and 2, it is seen that each tube 12, 12' provided at its end with a flange 13, 13' for connection to the associated cylinder (not shown) opens into one of the exhaust-gas manifolds 1,2,3,4 and 1',2',3',4'. The said manifolds are connected, through the medium of a pulsation-converter convergent nozzle 5 and 5', respectively, with a compact chamber 8 forming a mixing and attenuating casing common to both said manifold sets. The mixer and attenuator intermediate-chamber 8 is mounted between the two turbo-blowers 10 and 10'. Therefore, to each convergent nozzle 5 and 5' correspond four exhaust manifolds 1,2,3,4 and 1',2',3',4', respectively (FIG. 4). The pulsation converter proper is constituted by two partitions 6, 7 and 6', 7', respectively, forming four compartments within each convergent nozzle 5 and 5'. To each compartment is associated an exhaust-gas manifold. Owing to the high temperature of the gases flowing through the manifolds and then through the convergent nozzles, expansion compensators 9 and 9' are provided in the region of connection of the convergent nozzles 5 and 5', respectively, to the common mixer-attenuator casing 8. Likewise, the expansion compensators 11 and 11' are respectively mounted between the respective turbo-blowers 10 and 10' and the common mixer-attenuator casing 8.

FIG. 3 diagrammatically illustrates the principle of use of a device for connecting two sets of four exhaust manifolds to a common mixer-attenuator casing 8. It is seen that each cylinder 14, 15, 14' and 15' is connected, respectively, to a manifold 1,2,1',2', and other cylinders (not shown) are connected in the same manner to the manifolds 3,3', 4, 4'. The two sets of manifolds arranged in parallel relationship are connected directly with the mixer-attenuator casing 8, at each end of which is mounted a turbo-blower 10, 10'. Each turbo-blower 10, 10' receives the gases from the casing 8 through the medium of the turbine driving its intake-air compressor.

From the foregoing description it appears that the mixing casing 8 forms an intermediate volume which stabilizes the pressure and flow of the exhaust gases proceeding from the manifolds, such a design being highly advantageous compared with the designs known in the prior art. Moreover, the use of separate manifolds enables the advantages of the pressure-pulsation supercharging system to be retained, more particularly as far as the scavenging and the draining of the cylinders are concerned. In addition, is is readily understood that such a design permits simple mounting, since it is no longer necessary to provide multiple pipings for the connection of the manifolds with the turbo-blower. Now it is known that such multiple pipings result in increased pressure losses and thermodynamic losses of the fluid flowing therethrough. Consequently, the invention as compared with the prior art techniques enables a higher efficiency of the air-compressor turbine and the engine to be obtained and the overall dimensions of the engine to be reduced owing to the compact form of the mixer-attenuator casing (the said casing forming a tranquillization chamber).

Of course, the invention is by no means limited to the form of embodiment described and illustrated, which has been given by way of example only. In particular, it comprises all the means constituting technical equivalents to the means described as well as their combinations, should the latter be carried out according to the spirit of the invention.

What is claimed is:

1. In a supercharged internal combustion engine of the type comprising more than 12 cylinders arranged in V-shaped rows of cylinders each row including more than six cylinders, two corresponding clusters of exhaust manifolds and two corresponding like turbo-blowers one of said clusters and one of said turbo-blowers directly associated with respective ones of the said rows of cylinders, an arrangement for connecting said clusters of exhaust manifolds respectively to said turbo-blowers comprising common chamber means, two convergent nozzles each converging towards said chamber and connected thereto in respective regions adjacent respective of said turbo-blowers, said turbo-blowers communicating with said common chambers respectively at opposite ends thereof, said common chamber means acting as a mixing and attenuating casing and being located between the said turbo-blowers and being connected to each of the said clusters of exhaust manifolds via a corresponding one of said convergent nozzles, the exhaust manifolds of each cluster being in connection with a respective one of the convergent nozzles, each of which nozzles acting as a pulse converter.

2. A device according to claim 1, wherein each said pulse converter comprises partition means disposed in said convergent nozzle and arranged according to a crossed configuration defining compartments within said convergent nozzle, said compartments being connected with the manifolds of the associated cluster respectively.

3. A device according to claim 1, including expansion compensator means positioned adjacent to each connection of said mixing and attenuating casing with said convergent nozzles.

4. A device according to claim 1, including expansion compensator means adjacent to said turbo-blowers.

* * * * *